United States Patent
Kobayashi et al.

(10) Patent No.: US 6,779,573 B2
(45) Date of Patent: *Aug. 24, 2004

(54) PNEUMATIC TIRES (75) Inventors: Kazuomi Kobayashi, Higashimurayama (JP); Tomohisa Nishikawa, Kodaira (JP); Kenji Matsuo, Kodaira (JP)

(73) Assignee: Bridgestone Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/443,460

(22) Filed: Nov. 19, 1999

(65) Prior Publication Data

US 2003/0196738 A1 Oct. 23, 2003

(30) Foreign Application Priority Data

Nov. 19, 1998 (JP) .......................... 10-329418
Oct. 21, 1999 (JP) .......................... 11-299494

(51) Int. Cl.$^7$ .................. B60C 17/00; B60C 17/08; B60C 15/00; B60C 9/00
(52) U.S. Cl. ............... 152/517; 152/539; 152/541; 152/547; 152/555; 152/516
(58) Field of Search .................. 152/517, 532, 152/536, 541, 539, 547

(56) References Cited

U.S. PATENT DOCUMENTS

| 4,265,288 A | * | 5/1981 | Kaneko et al. ........... 152/209.1 |
| 4,287,924 A | * | 9/1981 | Deck ........................... 152/153 |
| 4,917,166 A | * | 4/1990 | Iuchi .......................... 152/541 |
| 5,058,646 A | * | 10/1991 | Kajikawa et al. ........... 152/454 |
| 5,427,166 A |   | 6/1995 | Willard, Jr. ................ 152/454 |
| 5,427,176 A | * | 6/1995 | Hayashi et al. ............ 152/517 |
| 5,769,980 A | * | 6/1998 | Spragg ...................... 152/541 |
| 6,119,748 A | * | 9/2000 | Kobayashi et al. ......... 152/539 |

FOREIGN PATENT DOCUMENTS

| EP | 0515226 | * | 11/1992 |
| EP | 0 542 252 A1 | * | 5/1993 |
| EP | 0 542 252 |   | 5/1993 |
| JP | 1-278806 | * | 11/1989 |
| JP | 04274909 | * | 9/1992 |
| JP | 04-274910 | * | 9/1992 |
| JP | 4-345505 | * | 12/1992 |
| JP | 08-175132 | * | 7/1996 |
| JP | 100776820 | * | 3/1998 |

* cited by examiner

Primary Examiner—Sam Chuan Yao
Assistant Examiner—Justin Fischer
(74) Attorney, Agent, or Firm—Sughrue Mion, PLLC

(57) ABSTRACT

A pneumatic tire having an aspect ratio of not less than 60 comprises a radial carcass of one or more plies, a belt, a bead filler rubber and a rubber reinforcing layer of substantially a crescent shape in section extending from a position near to a bead core to a position near to a tread end along an inner surface of an innermost carcass ply, wherein at least one rubber protection sheet being relatively soft is disposed between the bead filler rubber and the carcass ply surrounding it and/or between the rubber reinforcing layer and the carcass ply nearest thereto.

21 Claims, 11 Drawing Sheets

FIG. 6
Comparative

PNEUMATIC TIRES

BACKGROUND OF THE INVENTION

1. Field of the Invention

This invention relates to a pneumatic tire, and more particularly to a pneumatic radial tire belonging to a category known as so-called run-flat tire and capable of running over a given distance at a state that an internal pressure becomes zero (atmospheric pressure) or near to zero due to puncture or the like. Preferably, the invention relates to a pneumatic radial tire having a ratio of section height to section width or an aspect ratio of not less than 60 and an excellent run-flat durability ("run-flat" means the running at a punctured state) when being run at a high speed over a relatively long distance at the punctured state while holding a low cost and a handling easiness.

2. Description of Related Art

The run-flat type radial tire (hereinafter abbreviated as run-flat tire) is mainly used in vehicles such as passenger cars and the like under a relatively small loading applied to the tire. It is demanded that when the tire becomes a flat (punctured) state, even if it suddenly occurs during not only the running on general road but also the high-speed running on an expressway, the run-flat tire can safely be run without considerably degrading the steering stability of the vehicle, particularly a passenger car, and even if the running is continued at the punctured state over the relatively long distance, the run-flat tire can be safely and surely run over a given distance, for example, 80–160 km to an intended place without detaching from a rim used (approved rim) and causing the tire breakage.

For this end, there are proposed run-flat tires having various structures, which are often combined with a contrived approved rim. The tires for such proposals are roughly classified into a super low-section profile tire having an aspect ratio of less than 60 and a low-section profile tire having an aspect ratio of 60–80 in which the section height is relatively high.

Figure 5:
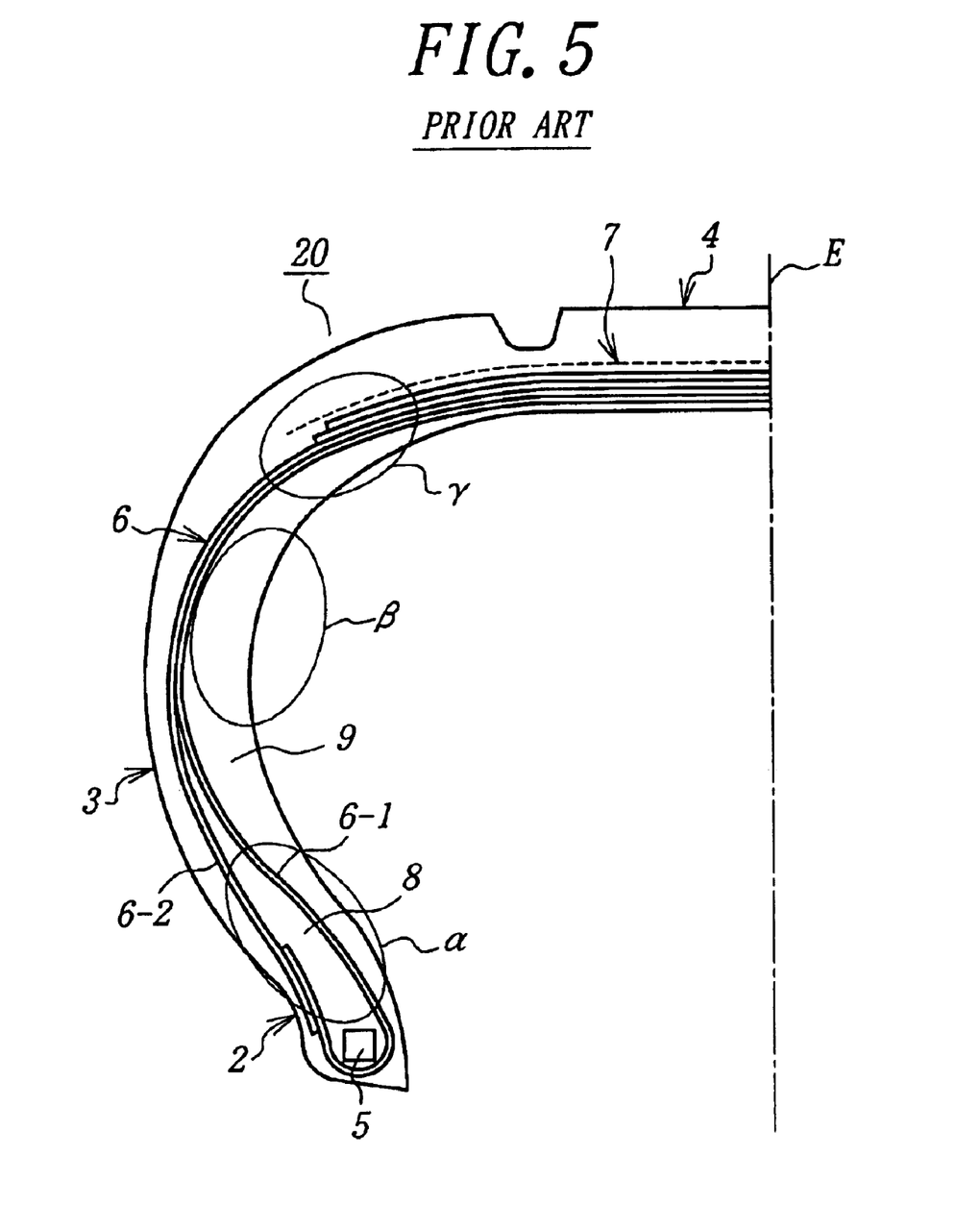
FIG. 5 is a diagrammatically left-half section view of the conventional tire.

As to the super low-section profile tire, an example (20) of run-flat tires put into practical use in the market at most is shown in FIG. 5. This tire 20 is a tire having a structure that a thick rubber reinforcing layer 9 having a crescent shape in section is arranged at an inner surface side of an innermost carcass ply 6-1 over a zone ranging from a bead portion 2 through a sidewall portion 3 to an end of a tread portion 4. Such a tire is often mounted onto a vehicle premising high-speed running such as a sports car, a sports-type car or the like.

In order to mitigate a degree of collapse deformation as far as possible when the tire 20 having the thick rubber reinforcing layer 9 is run at a flat state under loading, a radial carcass 6 is constituted by two or more plies comprising a turnup ply 6-1 wound around a bead core 5 from an inside of the tire toward an outside thereof and a down ply 6-2 enveloping the turnup ply 6-1 from the outside thereof, and a hard stiffener rubber 8 is arranged so as to extend from an outer peripheral surface of the bead core 5 up to a position near to a maximum tire width, and as the case may be, a rubberized layer of Kevlar cords or steel cords (which is called as an insert ply) is disposed in a zone ranging from the bead portion 2 to the sidewall portion 3.

On the other hand, the low-section profile tire having a relatively high section height is recently and frequently mounted onto an imported or domestic high-grade passenger car having a relatively great displacement. This type of the tire is possible to be run at the run-flat state in cooperation with a rim to be assembled, wherein an incorporation of a protect member for pushing a bead portion of the tire toward a rim flange onto the rim is the main current. Because, a height of a sidewall portion 3 in the low-section profile tire (see FIG. 5) is considerably higher than that of the super low-section profile tire and the sidewall portion 3 violently bends by a height difference between both the tires and as a result the desired run-flat durability can not be obtained.

In the tire 20 having the above construction as shown in FIG. 5, it is proposed and practiced to increase the thickness or the height of the rubber reinforcing layer 9, or to largely increase the hardness or modulus of rubber itself for improving the durability in the run-flat running. However, they have a limitation on manufacture and a limitation on the rising width of the cost, so that when the internal pressure is suddenly at a state of zero, it is particularly insufficient to ensure the steering stability of the vehicle in the high-speed running and also the durability is insufficient in the continuation of the running at the run-flat state. Therefore, it is desired to develop tires holding the above performances and improving the run-flat durability to a level causing no problem in practical use.

In the case of incorporating the protect member onto the rim, there is firstly a problem in so-called rim assembling operability because it is not easy to assemble the tire onto a wheel. Secondly, it is unavoidable to largely increase the weight in the tire-wheel assembly, which brings about significant increase of unsprung mass in the vehicle and hence the ride comfort of the vehicle against vibrations is considerably degraded, so that it is unsuitable as the tire for use in a high-grade passenger car.

Figure 6:
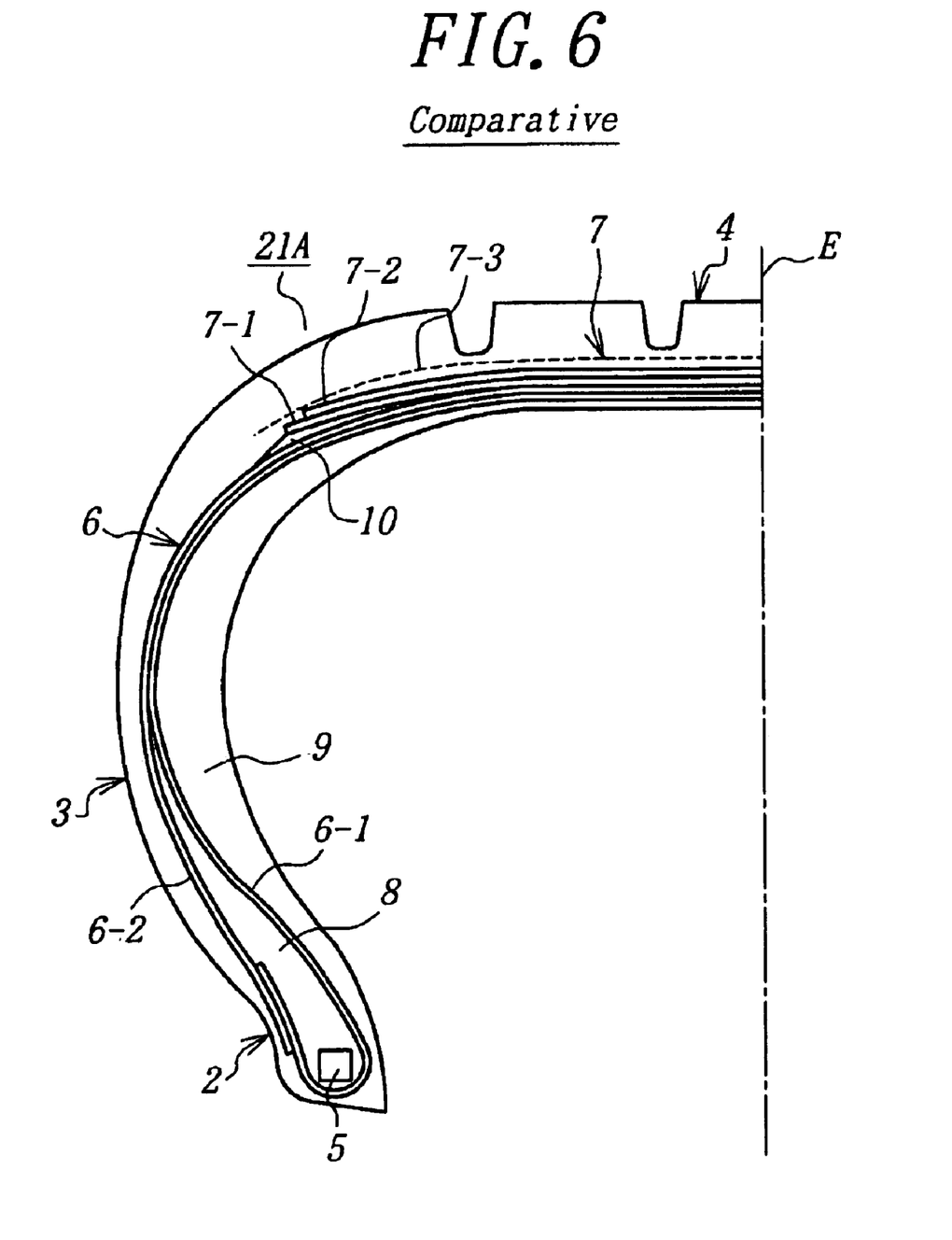
FIG. 6 is a diagrammatically left-half section view of a comparative pneumatic tire.

The inventors have thoroughly investigated a position and a cause of tire trouble generated in time series during the run-flat running of the tire 20 shown in FIG. 5 with respect to the run-flat durability and confirmed that a position of trouble most quickly generated in the tire is an end portion of γ-region in the belt 7 (see FIG. 5) and then such a trouble successively causes a trouble of the rubber reinforcing layer 9 in β-region of the sidewall portion 3 (see FIG. 5) and a trouble of the stiffener rubber 8 in α-region of the bead portion 2 (see FIG. 5). Therefore, the inventors have already proposed a pneumatic tire 21A having particularly an aspect ratio of not less than 60, in which a cushion rubber 10 as shown in FIG. 6 is interposed between the end portion of the belt 7 and the outermost carcass ply 6-2 (see FIG. 5) and tan δ of the cushion rubber 10 is made not more than that of a coating rubber for the cords of the carcass ply 6 as described in Japanese Patent Application No. 10-121422. This tire 21A is demonstrated that the remarkable improvement of the durability can advantageously be realized in the end portion of the belt 7 during the run-flat running to attain an excellent run-flat durability.

However, it is demanded to further improve the run-flat durability without stop at the present time. The run-flat durability satisfying the above demand is conditioned to satisfy that it is possible to at least run over a distance of 80–160 km as previously mentioned under the continuation of running at an upper level of limit speed at the run-flat state on the expressway even in the pneumatic tire having the aspect ratio of not less than 60. Under such a severer condition, it is the present state that it is required to more further improve the run-flat durability improved in the aforementioned pneumatic tire 21A.

SUMMARY OF THE INVENTION

It is, therefore, an object of the invention to provide a pneumatic tire having particularly an aspect ratio of not less than 60 which controls the cost to a level not causing trouble in practice, holds the handling easiness for rim assembling operability or the like and maintains the ride comfort within an acceptable range without causing inconvenience in the production applying the conventional thick rubber reinforcing layer, and guarantees the safe running of the vehicle such as passenger car or the like even if air is rapidly released due to the puncture or the like, and does not cause fatal trouble even if the high-speed running on the expressway is continued at a limit speed or a speed near thereto for a long time, and can develop a highly excellent run-flat durability.

According to the invention, there is the provision of a pneumatic tire comprising a radial carcass extending between a pair of bead cores embedded in the respective bead portions to reinforce a pair of sidewall portions and a tread portion and comprised of one or more rubberized cord plies, a belt arranged on an outer peripheral surface of the carcass to reinforce the tread portion, a bead filler rubber taperingly extending from a position just above the bead core toward an end of the tread portion, and a rubber reinforcing layer arranged at an inner surface side of an innermost carcass ply from a position near to the bead core in the bead portion to a position near to the end of the tread portion and having substantially a crescent shape at section thereof, in which at least one rubber protection sheet being relatively soft is disposed between the bead filler rubber and the carcass ply surrounding it and/or between the rubber reinforcing layer and the carcass ply adjacent thereto.

In a preferable embodiment of the invention, at least one ply of the carcass is a turnup ply wound around the bead core from an inside of the tire toward an outside thereof, which consists of a toroidally extending main body and a turnup portion.

Moreover, when the carcass is composed of two or more plies, it has so-called up-down ply structure consisting of a turnup ply having a turnup portion as mentioned above and a down ply enveloping the turnup ply inclusive of the turnup portion from the outside.

In another preferable embodiment of the invention, in a radial section of a tire-rim assembly when the tire is mounted onto a recommended rim and inflated under a pressure corresponding to 15% of a maximum air pressure, the rubber protection sheet is existent over both sides of a straight line drawn from a curvature center of a flange of the recommended rim at an inclination angle of 60° outwardly in a radial direction of the tire with respect to a line segment drawn from the curvature center in parallel to a rotating axial line of the tire toward the inside of the tire.

The term "maximum air pressure" used herein means a maximum air pressure (air pressure corresponding to a maximum load) disclosed in "General Information" of "The Tire and Rim Association Inc." (hereinafter abbreviated as "TRA standards") and the term "recommended rim" used herein means a recommended rim disclosed therein. More particularly, as the maximum air pressure and the recommended rim are used numerical values and rim sizes disclosed in "LOAD/INFLATION PRESSURE TABLE" and "RIM CONTOURS TABLE" established by every kind of tires in the TRA standards. Moreover, the recommended rim is a rim underlined in the lists of "RIM CONTOURS TABLE".

Furthermore, the wordings "the tire is mounted on the recommended rim and inflated under an air pressure corresponding to 15% of the maximum air pressure" used herein means that the tire mounted on the recommended rim is once inflated to an air pressure no less than the maximum air pressure to sufficiently fit the tire to the recommended rim and thereafter the filled air is deflated up to a weak pressure corresponding to 15% of the maximum air pressure, or once the filled air is deflated up to an internal pressure of zero, the compressed air is again filled to a weak pressure corresponding to 15% of the maximum air pressure while holding the sufficient fitted state.

In the other preferable embodiment of the invention, the rubber protection sheet is existent between line segments in parallel to the rotating axial line of the tire respectively passing through an outer end of the bead filler rubber in the radial direction of the tire and an inner end of the rubber reinforcing layer in the radial direction of the tire.

In a still further preferable embodiment of the invention, when the rubber protection sheet is disposed along the turnup portion of the carcass ply between the turnup portion and the bead filler rubber, a height Ha of an outer end of the rubber protection sheet in the radial direction of the tire as measured from an outermost end of the bead core in the radial direction of the tire is not more than two times a height Hb of an intersecting point between the straight line drawn from a curvature center of a flange of the recommended rim at an inclination angle of 60° outwardly in a radial direction of the tire with respect to a line segment drawn from the curvature center in parallel to a rotating axial line of the tire toward the inside of the tire and an outer surface of an outermost carcass ply as measured by the above same method.

As the properties of the rubber protection sheet, it is preferable that the rubber protection sheet has 50% modulus of 0.30–0.84 times that of the rubber reinforcing rubber and tan $\delta$ at 25° C. of 0.04–0.11.

The value of 50% modulus is determined by a calculating equation disclosed in the term of "tensile stress" according to the contents disclosed in "Tensile test method in the cured rubber" of JIS K 6251-1993. Moreover, the value of tan $\delta$ is determined by calculating a kind of the deformation as tensile according to "A case of the waveshape in the load and the waveshape in the flexure" among "(1) non-resonating methods" disclosed in "Method for testing dynamic nature in the cured rubber" of JIS K 6394-1995. Moreover, the value of tan $\delta$ in the actual test is determined under test conditions that an initial tensile load is 160 gf, a dynamic strain is 1.0%, and a frequency is 52 Hz.

As the thickness of the rubber protection sheet, it is preferable that rubber protection sheet has a thickness of 0.4–4.0 mm. Strictly speaking, the rubber protection sheet is more preferable to have a thickness of 0.6–4.0 mm when it is disposed between the bead filler rubber and the main body of the carcass ply and/or between the rubber reinforcing layer and the main body of the carcass ply, and 0.4–4.0 mm when it is disposed along the turnup portion of the carcass ply between the turnup portion and the bead filler rubber.

BRIEF DESCRIPTION OF THE DRAWINGS

The invention will be described with reference to the accompanying drawings, wherein.

DESCRIPTION OF THE PREFERRED EMBODIMENTS

Various embodiments of the invention will be described with reference to FIGS. 1–4.

Figure 1:
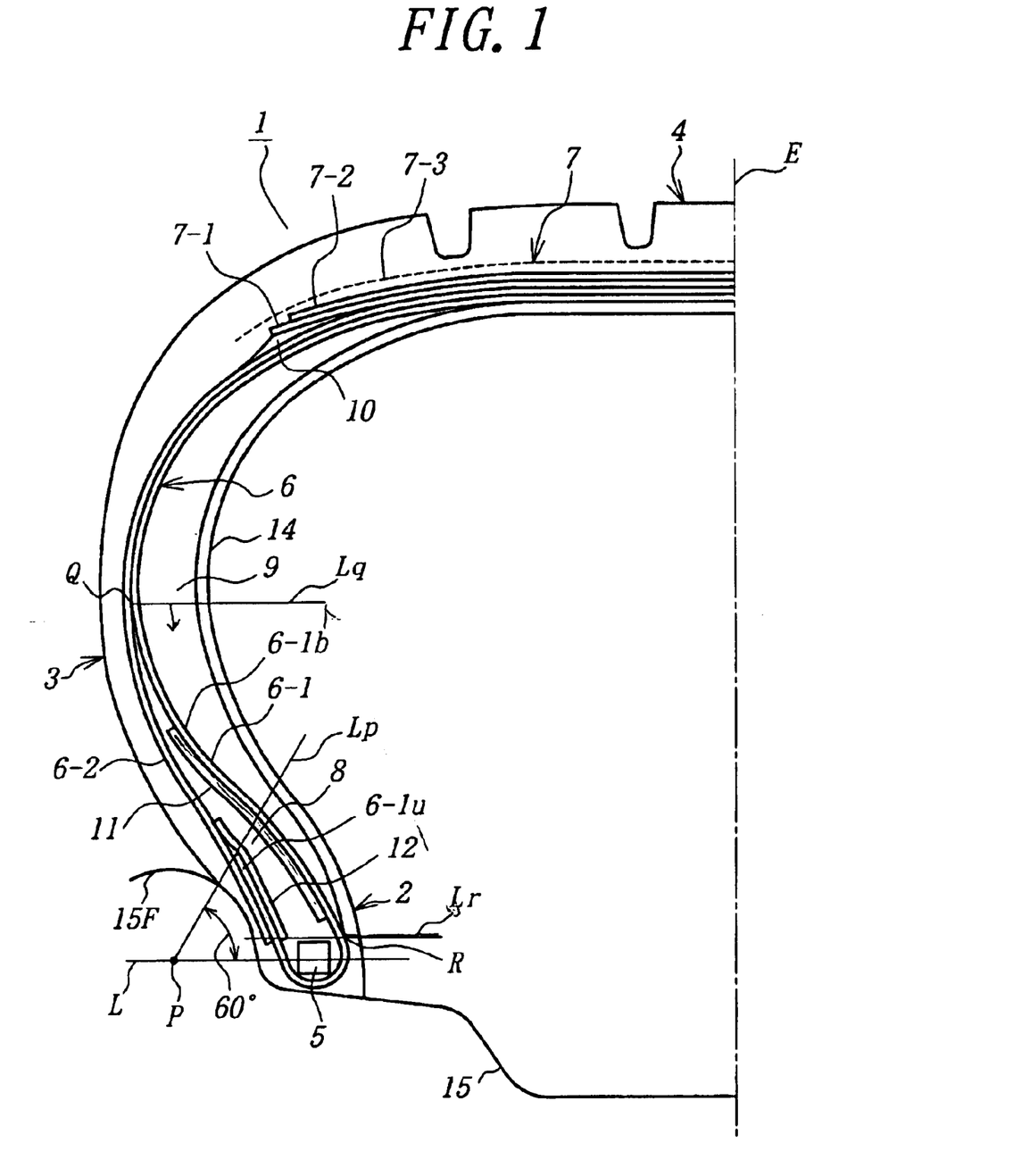
FIG. 1 is a diagrammatically left-half section view of an assembly of a first embodiment of the pneumatic tire according to the invention and a recommended rim.
Figure 2:
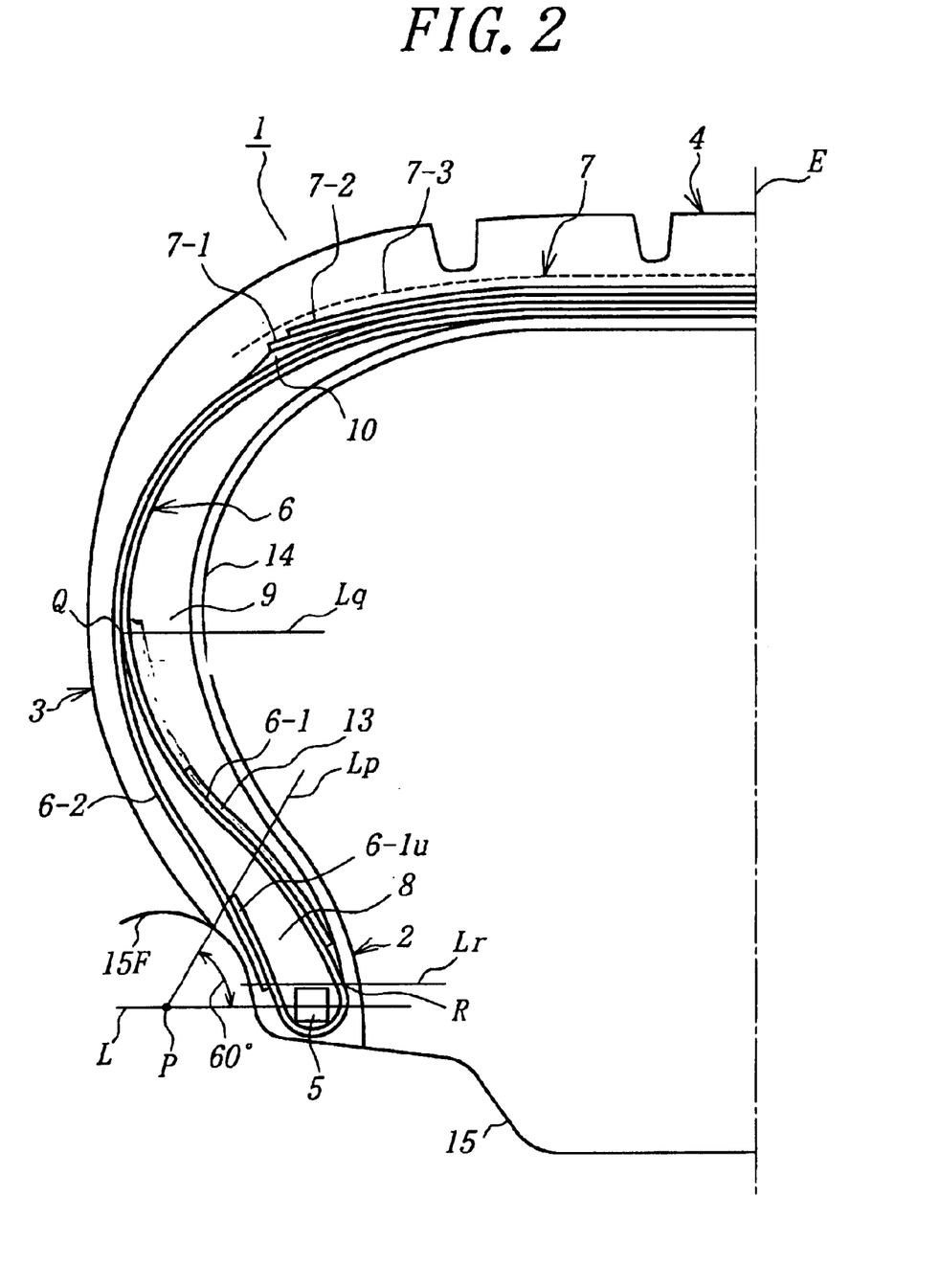
FIG. 2 is a diagrammatically left-half section view of an assembly of a second embodiment of the pneumatic tire according to the invention and a recommended rim.
Figure 3:
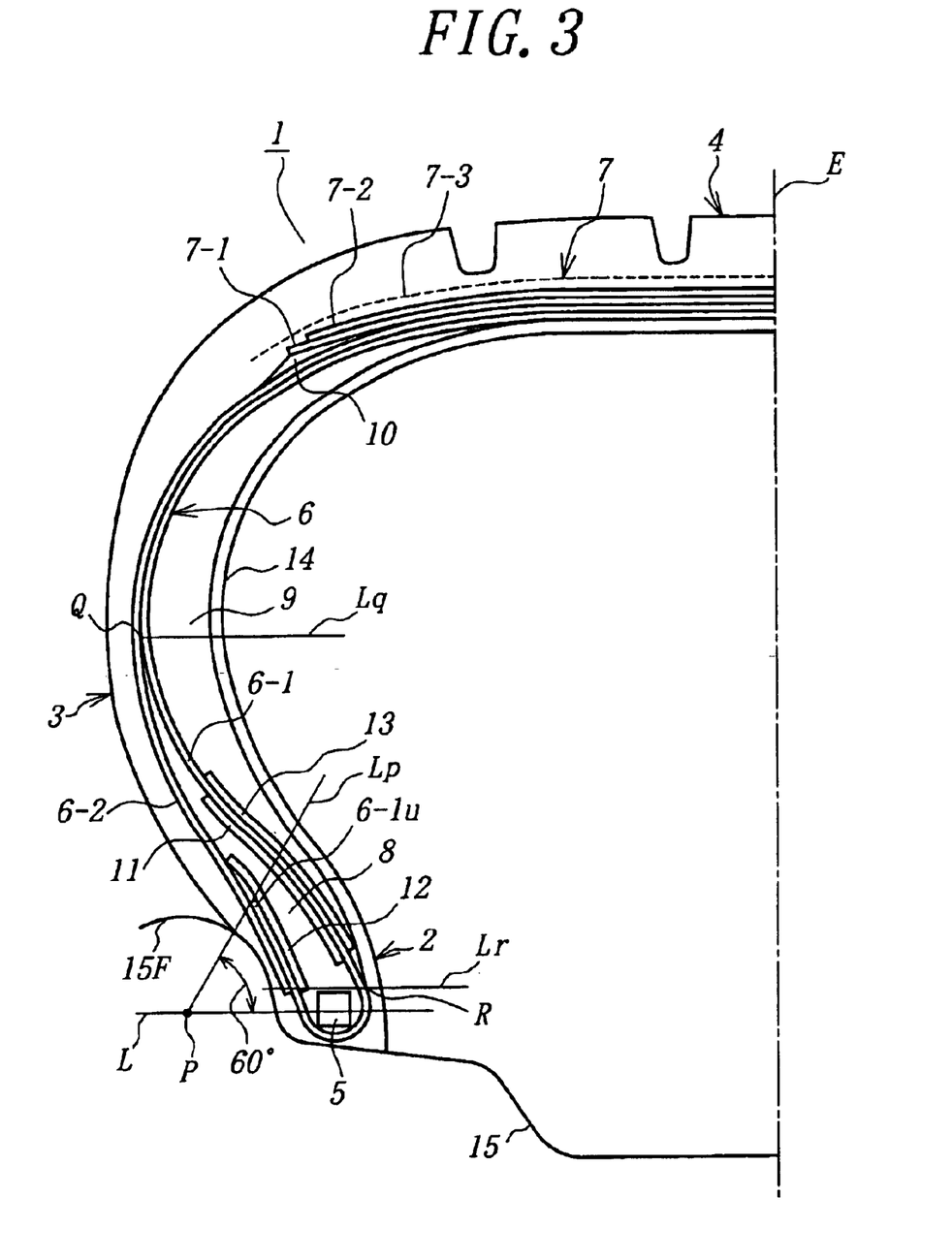
FIG. 3 is a diagrammatically left-half section view of an assembly of a third embodiment of the pneumatic tire according to the invention and a recommended rim.
Figure 4:
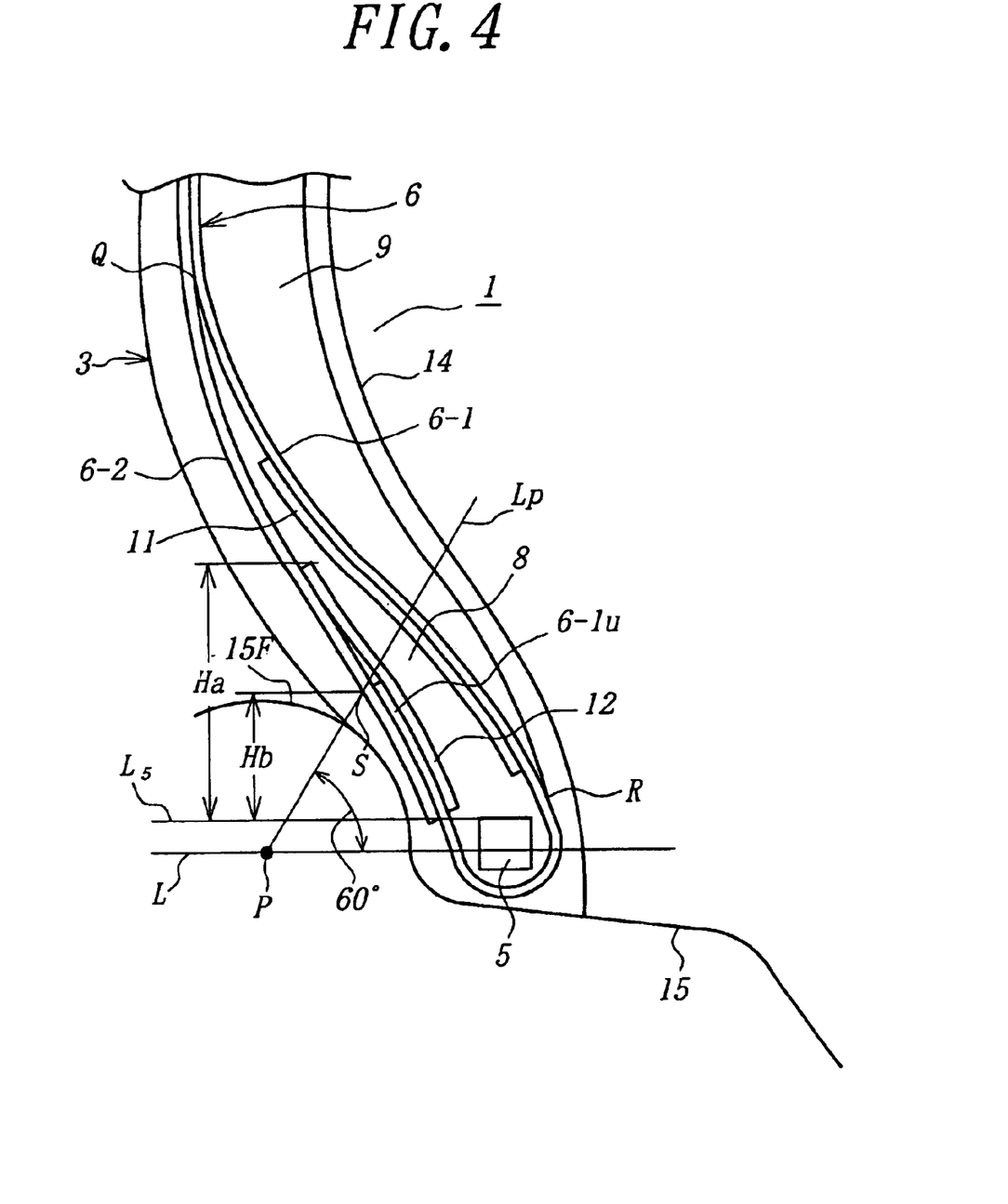
FIG. 4 is a diagrammatically enlarged section view of a main part of the tire-rim assembly shown in FIG. 1.

In FIG. 1 is shown a diagrammatically left-half section of an assembly when a first embodiment of the pneumatic tire according to the invention is mounted on a recommended rim and inflated under a weak internal pressure, and FIGS. 2 and 3 show another assemblies when second and third embodiments of the pneumatic tires according to the invention are mounted on a recommended rim and inflated under a weak internal pressure, respectively. In FIG. 4 is shown a diagrammatically enlarged section view of a main part around a bead portion of the tire shown in FIG. 1.

The pneumatic tires 1 shown in FIGS. 1–3 are pneumatic tires for passenger car having an aspect ratio of not less than 60. The tire 1 comprises a pair of bead portions 2 (only one side thereof is shown), a pair of sidewall portions 3 (only one side thereof is shown), a tread portion 4 linked to both sidewall portions 3, a radial carcass 6 extending between a pair of bead cores 5 embedded in the respective bead portions 2 to reinforce the portions 1, 2 and 3 and comprised of one or more rubberized cord plies (two plies in the illustrated embodiments), and a belt 7 arranged on an outer circumference of the carcass 6 to reinforce the tread portion 4.

The carcass 6 in the illustrated embodiments comprises a turnup ply 6-1 wound around the bead core 5 from an inside of the tire toward an outside thereof to form a turnup portion 6-1u and a down ply 6-2 enveloping a main body 6-1b and the turnup portion 6-1u of the turnup ply 6-1 from the outside thereof and having an end in the vicinity of the bead core 5. In the carcass 6 of the illustrated embodiments, the turnup ply 6-1 forms an innermost carcass ply.

Each of the turnup ply 6-1 and down ply 6-2 constituting the carcass 6 is a rubberized ply of radial cord arrangement, wherein an organic fiber cord such as polyester cord, rayon cord, nylon cord or the like is used as a ply cord. Moreover, the carcass 6 may be comprised of two or more turnup plies 6-1 and one or more down plies 6-2, or may be comprised of only the turnup ply 6-1.

The belt 7 is comprised of two or more cord layers, preferably two cross cord layers in the illustrated embodiment, desirably two cross steel cord layers 7-1 and 7-2 and may comprise an organic fiber cord layer enveloping the two cross steel cord layers on the outer circumference thereof as shown by broken line in FIG. 1, for example, a spirally wound layer 7-3 of nylon-6,6 cord or Kevlar cord. The cross steel cord layers have a structure that the steel cords of these layers are crossed with each other with respect to an equatorial plane E of the tire. In the illustrated embodiment, the width of the steel cord layer 7-1 adjacent to the carcass 6 is wider than that of the steel cord layer 7-2 located at the outside of the steel cord layer 7-1.

And also, the tire 1 comprises a hard bead filler rubber 8 taperingly extending from an outer peripheral face of the bead core 5 toward an end of the tread portion 4, which is covered with the turnup ply 6-1 inclusive of the turnup portion 6-1u and the down ply 6-2.

Furthermore, the tire 1 comprises a rubber reinforcing layer 9 (only one side thereof is shown) having a crescent shape in section inherent to the run-flat tire, which extends from a position near to the bead core 5 in the bead portion 2 to a position near to the end of the tread portion 4 at an inner surface side of an innermost ply of the carcass 6, that is, the turnup ply 6-1 in FIG. 1. The rubber reinforcing layer 9 is made of a hard rubber for stably supporting the total weight of the running vehicle even if the internal pressure of the tire is zero and preventing the detaching of the tire 1 from the rim to prevent the breakage of the tire and holding the running stability even at the rapid puncture during the high-speed running at, for example, 80–160 km/h, wherein the layer 9 has a thickness of 8–12 mm at a central region in the radial direction of the tire and is tapered at both ends thereof in the radial direction.

Moreover, the tire 1 comprises a cushion rubber 10 interposed between an end portion of the belt 7 and the down ply 6-2 as an outermost ply of the carcass 6, wherein tan δ of the cushion rubber 10 is made not more than that of a coating rubber for the cord of the down ply 6-2 for improving the run-flat durability at the end portion of the belt 7.

In the tire 1 of FIG. 1, at least one rubber protection sheet is disposed between the bead filler rubber 8 and the carcass ply surrounding it, that is, among the main body 6-1b and the turnup portion 6-1u of the turnup ply 6-1, the down ply 6-2 and the bead filler rubber 8. More particularly, the tire comprises two rubber protection sheets in total, wherein a rubber protection sheet 11 being softer than the bead filler rubber 8 is disposed between the main body 6-1b of the turnup ply 6-1 and the bead filler rubber 8, and a rubber protection sheet 12 being softer than the bead filler rubber 8 is disposed between a ply zone ranging from the turnup portion 6-1u to the down ply 6-2 and the bead filler rubber 8.

Further explaining in detail, the tire 1 of FIG. 1 comprises the rubber protection sheets 11, 12 among the surface of the carcass ply surrounding the bead filler rubber 8, that is, surface of the main body 6-1b of the turnup ply 6-1 facing the outside of the tire (hereinafter abbreviated as the outer surface), surface of the turnup portion 6-1u facing the inside of the tire (hereinafter abbreviated as the inner surface) and inner surface of the down ply 6-2, and the bead filler rubber 8 opposite to these surfaces.

Moreover, the wordings "the rubber protection sheet 11 is disposed between the bead filler rubber 8 and the main body 6-1b of the turnup ply 6-1" concretely means that the bead filler rubber 8 and the main body 6-1b of the turnup ply 6-1 are connected to each other through the rubber protection sheet 11, and the wordings "the rubber protection sheet 12 is disposed between the bead filler rubber 8 and the ply zone ranging from the turnup portion 6-1u to the down ply 6-2" concretely means that the bead filler rubber 8 and the ply zone are connected to each other through the rubber protection sheet 12. Further, in case of the tire having such a construction that the turnup end of the turnup portion 6-1u reaches to the sidewall portion or a position exceeding it, the rubber protection sheet 12 is not necessarily joined to the down ply 6-2.

Next, the tire 1 shown in FIG. 2 comprises a rubber protection sheet 13 between the rubber reinforcing layer 9 and the surface of the carcass ply most adjacent thereto, i.e. the inner surface of the main body 6-1b of the turnup ply 6-1 in the illustrated embodiment, which is softer than the rubber reinforcing layer 9.

And also, the tire 1 shown in FIG. 3 is a tire having the rubber protection sheets 11 and 12 shown in FIG. 1 and the rubber protection sheet 13 shown in FIG. 2. Therefore, the invention includes the tire having only the rubber protection sheet 11, the tire having only the rubber protection sheets 11 and 12, and the tire having all the rubber protection sheets 11, 12 and 13. Each of inner ends of the rubber protection sheets 11, 12, 13 in the radial direction shown in FIGS. 1–3 is located in the vicinity of the bead core 5.

All of the rubber protection sheets 11, 12 and 13 have rubber properties different from those of the bead filler rubber 8 and the rubber reinforcing layer 9. Among the rubber protection sheet 11, 12, 13, the bead filler rubber 8 and the rubber reinforcing layer 9, JIS hardness and 50% modulus ($M_{50}$) of rubber are relatively high in the bead filler rubber 8 and the rubber reinforcing layer 9, and JIS hardness and 50% modulus ($M_{50}$) of the rubber protection layer 11, 12, 13 are lower than those of the bead filler rubber 8 and the rubber reinforcing layer 9. Moreover, numeral 14 in FIGS. 1–3 is an innerliner made of a halogenated butyl rubber having an excellent air impermeability, so that the tire 1 is a tubeless tire.

The troubles at regions shown by symbols α and β generated in the conventional run-flat tire 20 of FIG. 5 are possible to be improved to a certain extent by increasing the volumes of the bead filler rubber 8 in the region α and the reinforcing rubber layer 9 in the region β under a certain ratio and enhancing the hardness and modulus of rubber to reduce strain at the regions α and β during the running at run-flat state. However, when the position of the initially generated trouble transfers from the regions α and β to a region γ in an end portion of the belt 7, there is caused a limit in the degree of improving the trouble, and such an improving limit can not satisfy the demand for the improvement of the run-flat durability in customer's market In order to more enhance the degree of improving the trouble during the running at the run-flat state, there is already proposed the run-flat tire 21A comprising the cushion rubber layer 10 disposed between the end of the innermost cord layer 7-1 of the belt 7 and the outermost down ply 6-2 as previously mentioned, whereby the run-flat durability in the region γ is considerably improved and hence the run-flat durability , which has never been seen in the conventional technique, can be realized. However, it is demanded to further improve the run-flat durability without stop at the present time, so that in order to satisfy such a demand, it is required to solve such a circulating problem that it is apt to create the trouble at the region α due to lacking of the balance on the durability to the region γ with the improvement of the run-flat durability at the region γ of the tire 21A.

Figure 7:
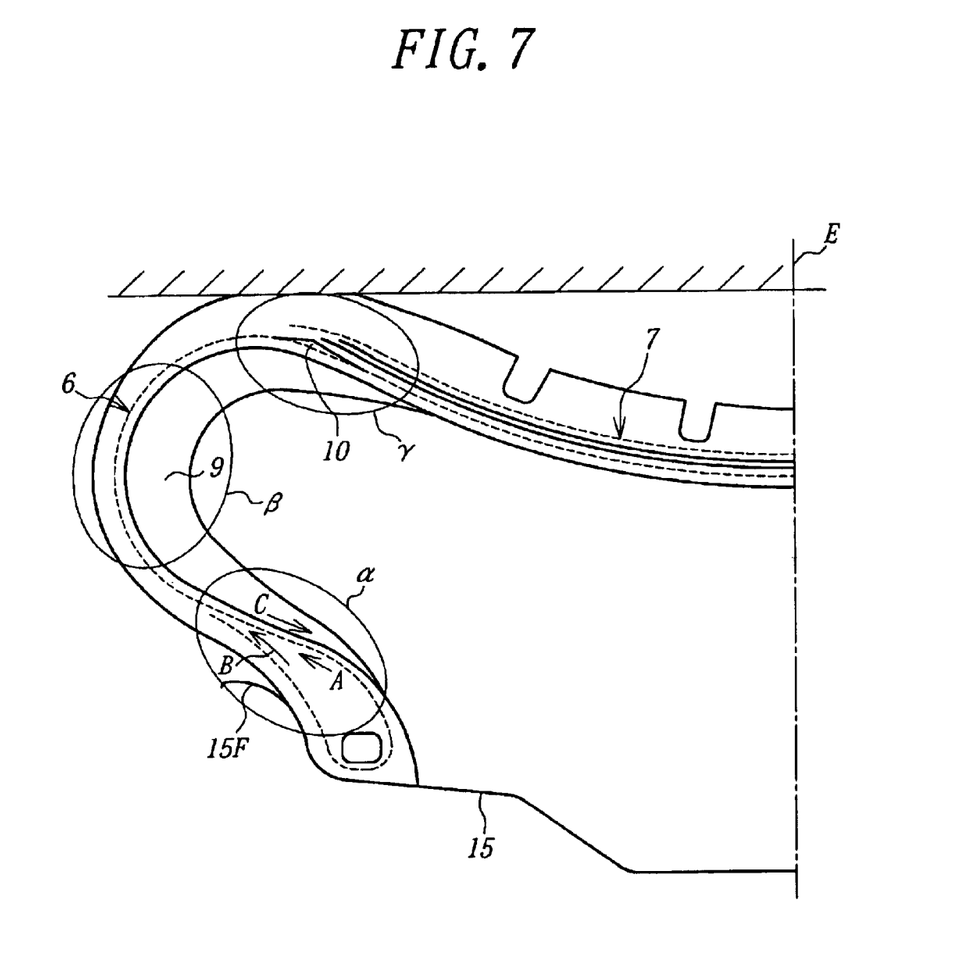
FIG. 7 is a diagrammatically half section view of an assembly of another comparative tire and a recommended rim during the running at a run-flat state.

The troubles newly created at the region α are a separation failure between the bead filler rubber 8 and the ply of the carcass 6 joined to both sides of the bead filler rubber 8, or a separation failure between the rubber reinforcing layer 9 arranged opposite to the bead filler rubber 8 and the ply of the carcass 6. As a result of investigations on the mechanism creating the separation failures, the followings can be elucidated. The investigation results are described with reference to FIG. 7 showing the left-half section of the tire run at the run-flat state. In FIG. 7, numeral 15 is a recommended rim and numeral 15F a flange.

It is confirmed in FIG. 7 that in order to reduce strain creating at the region α and strain creating at the region β as far as possible, when the modulus and hardness of rubber in both the bead filler rubber 8 and the rubber reinforcing layer 9 are enhanced and the volume of rubber is increased, the effect of controlling the occurrence of the separation failure is clearly developed in the region β, while the separation failure is still caused in the region α and the effect of controlling the trouble is hardly developed.

The inventors have investigated how strain is applied to the region α during the running of the tire at the run-flat state under loading and found that a large shearing strain εa in the direction of an arrow A shown in FIG. 7 is created in the joint face between the main body 6-1b of the carcass 6 and the bead filler rubber 8, a large shearing strain εb in the direction of an arrow B is created in the joint face between the turnup portion 6-1u of the carcass 6 (including the down ply 6-2 in case of the tire having a low height of the turnup portion) and the bead filler rubber 8, and a large shearing strain εc in the direction of an arrow C opposite to the directions of the shearing strains εa and εb is created in the joint face between the main body 6-1b of the carcass 6 and the rubber reinforcing layer 9, respectively.

Further, it is confirmed that the shearing strains εa and εb are caused by a pushing force of the bead core 5 (which is substantially made of a steel material) to the bead filler rubber 8, and a pushing force of the flange 15F of the rim 15 is further added to the shearing strain εb, and the shearing strain εc is caused by a displacement tendency of the rubber reinforcing layer 9 toward the bead core 5, and elucidated that the shearing strains εa, εb and εc act to peel off the ply cord of the carcass from the coating rubber therefor to cause a nucleus of initial separation failure between the cord and the coating rubber and such a nucleus is rapidly grown to result in the separation failure.

In the tire wherein the shearing strains εa and εb in the arrow directions A and B are considerably large as compared with the shearing strain εc in the arrow direction C, therefore, as shown in the tire 1 of FIG. 1, the rubber protection sheet 11 being softer than the bead filler rubber 8 is disposed between the bead filler rubber 8 and the outer surface of the main body 6-1b of the turnup ply 6-1, and the rubber protection sheet 12 being softer than the bead filler rubber 8 is disposed between the bead filler rubber 8 and the ply portion ranging from the inner surface of the turnup portion 6-1u to the inner surface of the down ply 6-2, whereby the shearing strains εa and εb are concentrically applied to the rubber protection sheets 11 and 12, respectively.

Since the rubber protection sheets 11 and 12 are softer than the bead filler rubber 8, even if the shearing strains εa and εb are concentrated onto the rubber protection sheets 11 and 12, the shearing stress of the rubber protection sheets 11, 12 exerting on the main body 6-1b of the turnup ply 6-1 and the ply zone including the turnup portion 6-1u becomes smaller than the shearing stress of the bead filler rubber 8 itself in the tire having no rubber protection sheets 11 and 12.

As a result, strain between the cord and the coating rubber is largely decreased in the main body 6-1*b* of the turnup ply 6-1 subjected to an action of the smaller shearing stress and also strain between the cord and the coating rubber is largely decreased in the ply zone inclusive of the turnup portion 6-1*u* subjected to an action of smaller shearing stress, so that the occurrence of separation nucleus in the cord at the region α and the growth of the nucleus into the separation failure are sufficiently controlled and finally the run-flat durability of the tire 1 as a whole is highly improved. Such an effect is always guaranteed because the deformation at the region α during the running at the run-flat state is a constant strain deformation.

In the tire wherein the shearing strain $\epsilon c$ in the arrow direction C is considerably larger than the shearing strains $\epsilon a$ and $\epsilon b$ in the arrow directions A and B, as shown in the tire 1 of FIG. 2, the rubber protection sheet 13 being softer than the rubber reinforcing layer 9 is disposed between the rubber reinforcing layer 9 located opposite to the bead filler rubber 8 and the carcass ply nearest thereto, that is, the inner surface of the main body 6-1*b* of the turnup ply 6-1, whereby the shearing strain $\epsilon c$ is concentrically applied onto the rubber protection sheet 13 and hence the shearing stress of the rubber protection sheet 13 exerting on the main body 6-1*b* of the turnup ply 6-1 is decreased. Thus, the strain between the cord and the coating rubber is largely decreased in the main body 6-1*b* of the turnup ply 6-1 to sufficiently control the occurrence of the separation failure at the region α, so that the run-flat durability of the tire 1 as a whole is highly improved likewise the above case.

Furthermore, in the tire wherein any of the shearing strains $\epsilon a$, $\epsilon b$ and $\epsilon c$ can not ignore, as shown in FIG. 3, all of the aforementioned rubber protection sheets 11, 12 and 13 are arranged, whereby there can be prevented the occurrence of the separation failure at each portion of the region α subjected to the action of shearing strains $\epsilon a$, $\epsilon b$, $\epsilon c$. Moreover, when the shearing strain is $\epsilon a >> \epsilon b$, only the rubber protection sheet 11 may be arranged, while when the shearing strain is $\epsilon a << \epsilon b$, only the rubber protection sheet 12 may be arranged.

In FIGS. 1–3 are shown the radial left-half sections of the tire-rim assembly when the tire 1 is mounted onto the recommended rim 15 (only an outline of the rim is shown in FIGS. 1–3) and inflated under a weak pressure corresponding to 15% of the maximum air pressure in the tire 1, respectively. In this case, it is required that at least one rubber protection sheet 11, 12, 13 is existent over both sides of a straight line Lp drawn from a curvature center P of an arc of an outer profile of the flange 15F of the rim 15 at an inclination angle of 60° outwardly in the radial direction of the tire with respect to a line segment L drawn from the curvature center P in parallel to a rotating axial line (not shown) of the tire 1 toward the inside of the tire because the aforementioned region α (see FIG. 5) is existent over both sides of the straight line Lp including thereon.

In FIGS. 1–3, the rubber protection sheets 11, 12 and 13 are arranged within a zone sandwiched between a straight line Lq passing through an outer end Q of the bead filler rubber 8 in the radial direction and in parallel to the rotating axial line of the tire 1 and a straight line Lr passing through an inner end R of the rubber reinforcing layer 9 and in parallel to the rotating axial line of the tire 1.

In FIG. 4 enlargedly showing the main part of the tire 1 of FIG. 1, when the rubber protection sheet 12 is disposed between the turnup portion 6-1*u* of the carcass ply and the bead filler rubber 8 along the turnup portion 6-1*u*, a height Ha (mm) of an outer end of the rubber protection sheet 12 in the radial direction as measured from a straight line $L_5$ passing through a maximum radius position of the bead core 5 in parallel to the rotating axial line of the tire 1 in the radial direction is suitable within a range of Ha=1.6×Hb~2.0×Hb with respect to a height Hb (mm) of an intersecting point S between the straight line Lp of 60° passing through the curvature center P and an outer surface of the outermost ply of the carcass 6 or outer surface of the down ply 6-2 in the illustrated embodiment as measured from the straight line $L_5$. When the height Ha is within the above range, the rubber protection sheet 12 can be arranged in the region α as mentioned above. If the rubber protection sheet 12 is extended so as to exceed the height Ha over 2×Hb, the effect of controlling the occurrence of ply separation failure in the carcass 6 is not improved. On the other hand, the lower height limit of the outer end Q of the bead filler rubber 8 in the radial direction is favorable to be not less than 2×Hb.

Next, the rubber protection sheet 11, 12, 13 will be described with respect to adaptable rubber property range and thickness range. These ranges are leaded by summarizing experimental results with respect to radial tires 1 for passenger car having three tire sizes. These tire sizes are 225/60R16, 215/65R15 and 245/70R16 (for RV vehicle). Each of these tires 1 is mounted on a recommended rim 15 of every tire size and inflated under a maximum air pressure to perfectly fit the tire 1 onto the rim 15 once and thereafter the air pressure is released to zero (a state detaching a valve core). Such an assembly of the tire 1 and the rim 15 is pushed on a drum rotating at a surface speed of 89 km/h under a load corresponding to about 76% of a maximum load capacity of the tire, during which a running distance until the occurrence of trouble is measured to evaluate the run-flat durability.

As an amount of heat generation at the region α is large in the running of the tire 1 at the run-flat state under loading, it is required to avoid thermal trouble due to high temperature, so that tan δ at 25° C. is firstly taken as the rubber property controlling the amount of heat generation. An experiment for evaluating the run-flat durability in four levels of tan δ in the rubber protection sheets 11, 12 and 13 is carried out to plot the experimental results in FIG. 8. Then, an experiment for evaluating the run-flat durability is carried out by using 50% modulus ($M_{50}$) capable of effectively concentrating in the rubber protection sheet 11, 12, 13 in four levels as a ratio to 50% modulus ($M_{50}$) of the rubber reinforcing layer 9 to plot the experimental results in FIG. 9. In this case, the same rubber is used in both the bead filler rubber 8 and the rubber reinforcing layer 9.

On the other hand, the adaptable thickness of the rubber protection sheets 11, 12 and 13 is divided into the case of the rubber protection sheets 11, 13 and the case of the rubber protection sheet 12 and the respective thickness is rendered into five levels. An experiment for evaluating the run-flat durability of the tire 1 is carried out at each level to plot experimental results in FIG. 10 in case of the rubber protection sheets 11, 13 and experimental results in FIG. 11 in case of the rubber protection sheet 12, respectively. The numerical value on the ordinate in FIGS. 8–11 is represented by an index on the basis that the improved tire 21A of the conventional tire 20 is 100 as a control tire, wherein the larger the index value, the better the property. Moreover, the mark "●" represents the ply separation failure and the mark "■" is not the ply separation failure but represents the breakage of the rubber reinforcing layer 9.

Figure 8:
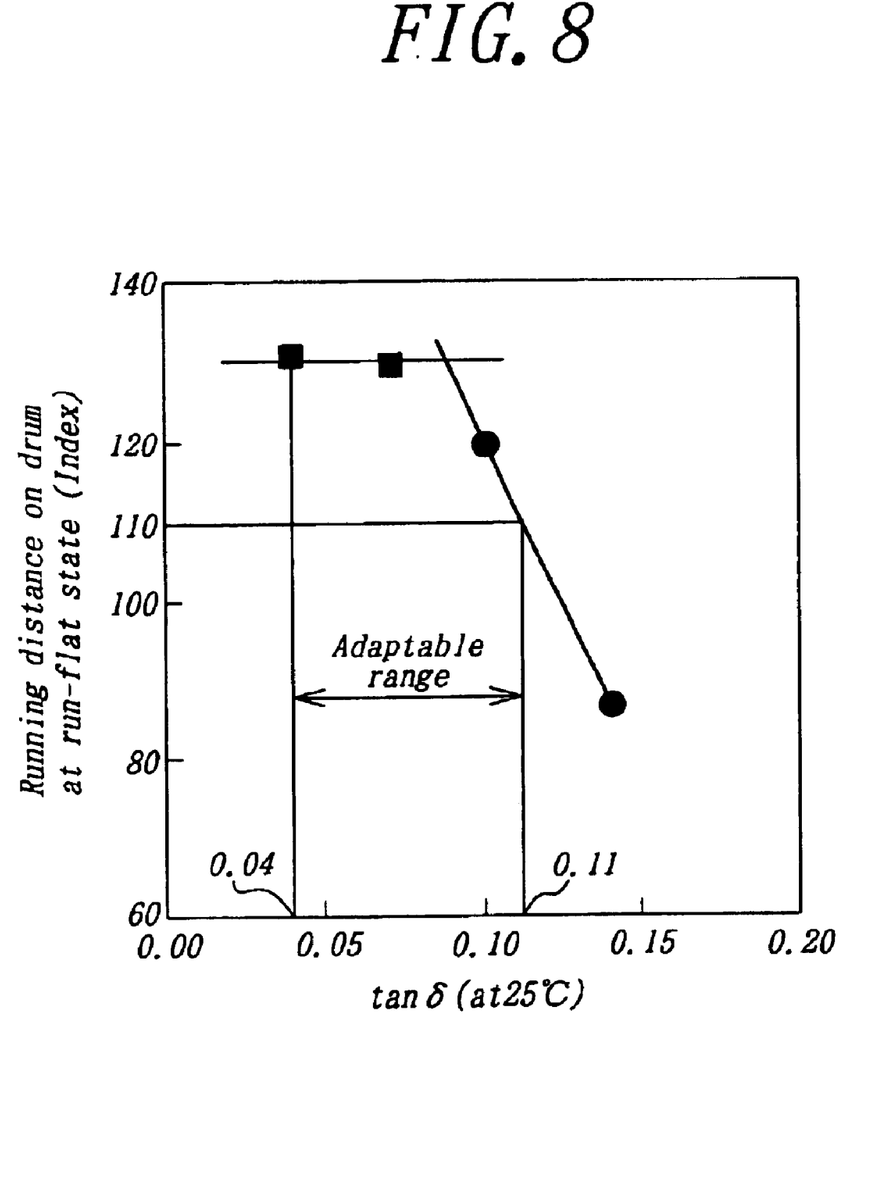
FIG. 8 is a graph showing a relationship between running distance on a drum at a run-flat state and tan δ.

From FIG. 8, it is clear that rubber having tan δ at 25° C. of not more than 0.11 is suitable as the rubber protection sheet 11, 12, 13, while when tan δ is less than 0.04, the improvement of the run-flat durability is not recognized (based on another experiment) and the tensile strength becomes too small and is unsuitable as the rubber for the rubber protection sheet, so that tan δ at 25° C. is preferable to be within a range of 0.04–0.11.

Figure 9:
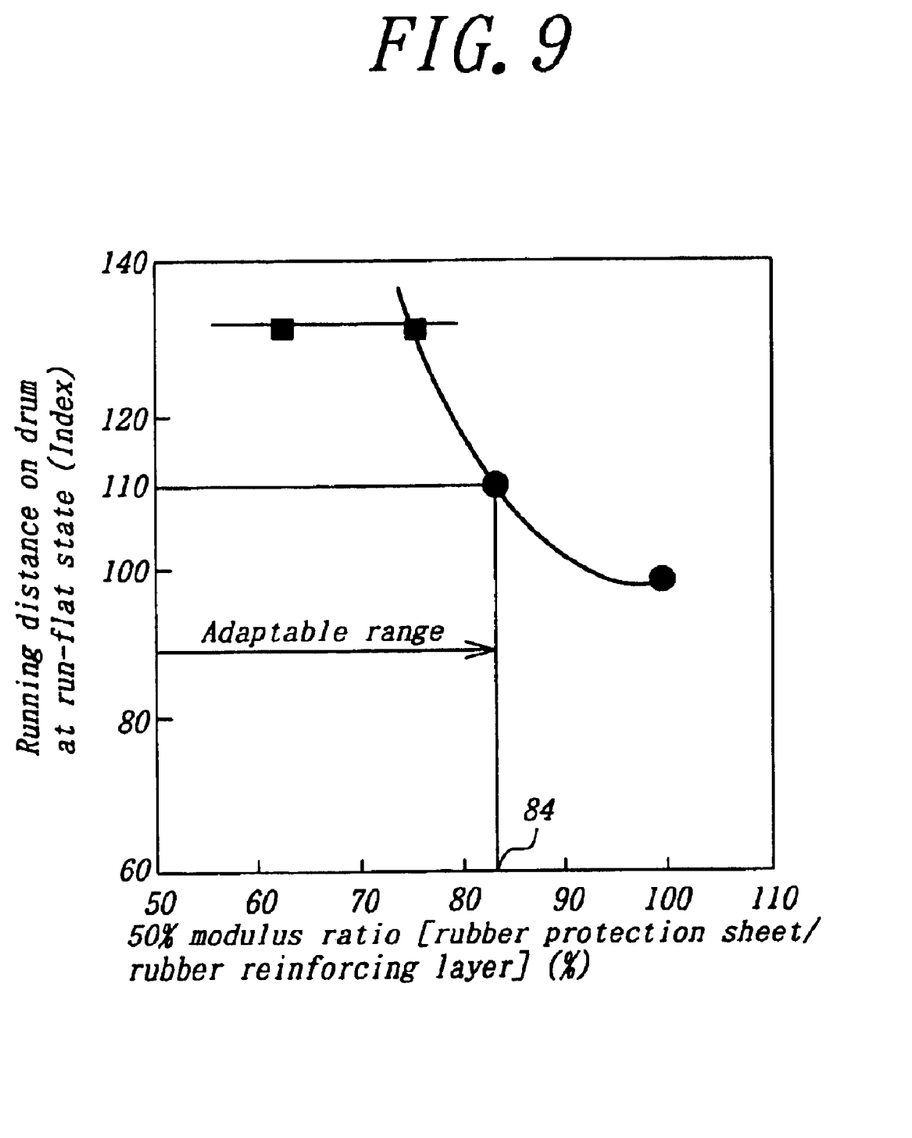
FIG. 9 is a graph showing a relationship between running distance on a drum at a run-flat state and 50% modulus ratio of a rubber protection layer to a rubber reinforcing layer.

From FIG. 9, it is clear that the ratio of 50% modulus of the rubber protection sheet to 50% modulus of the bead filler rubber 8 and the rubber reinforcing layer 9 of not more than 84% is suitable as the rubber protection sheet 11, 12, 13, while when the ratio of 50% modulus is less than 30%, the extremely step difference of the rigidity occurs between the bead filler rubber 8 and the rubber reinforcing layer 9 and hence the trouble is transferred to the rubber protection sheets 11, 12 and 13 to offset the effect using the rubber protection sheets. Therefore, 50% modulus of the rubber protection sheet 11, 12, 13 is suitable within a range of 0.30–0.84 times that of the rubber reinforcing layer 9 (the bead filler rubber 8). Moreover, the upper limit in FIGS. 8 and 9 is based on not less than 1.1 times of the control tire 21A.

Figure 10:
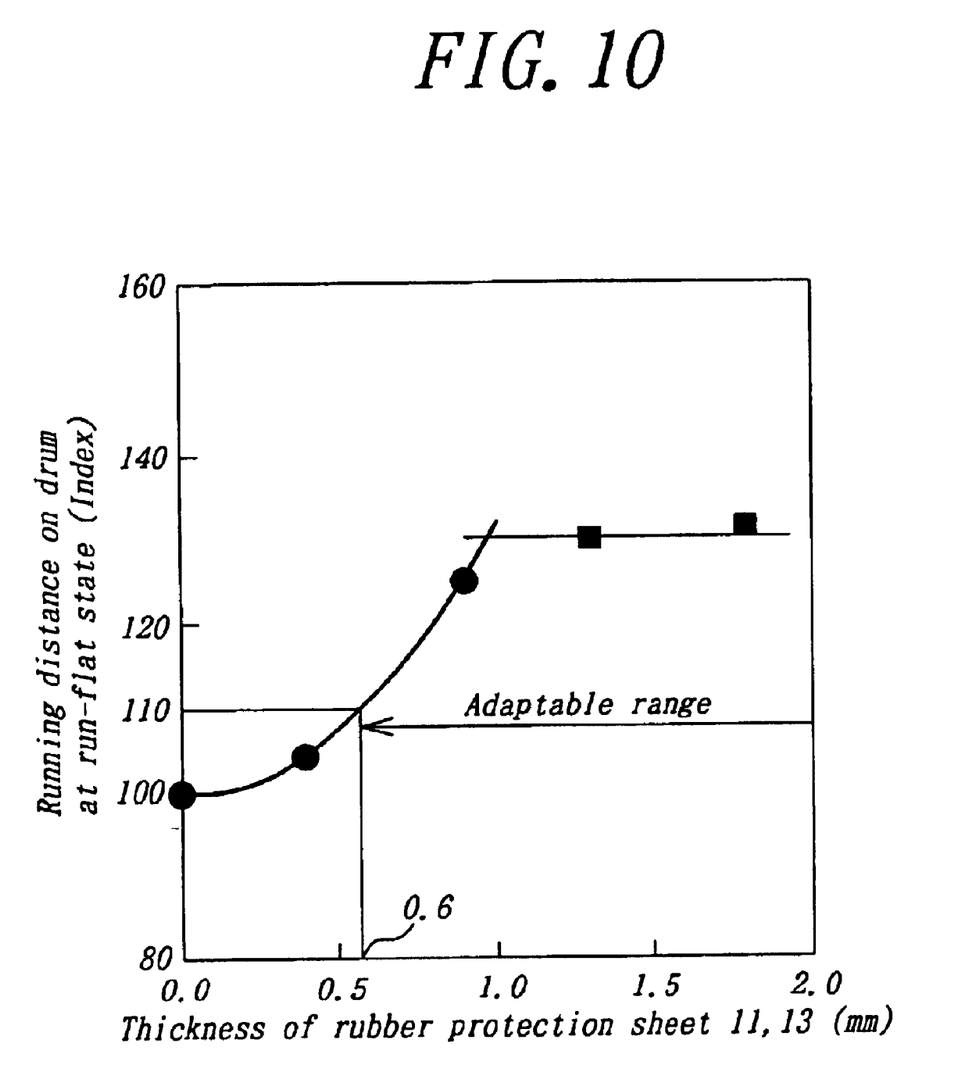
FIG. 10 is a graph showing a relationship between running distance on a drum at a run-flat state and thickness of rubber protection sheets 11, 13.
Figure 11:
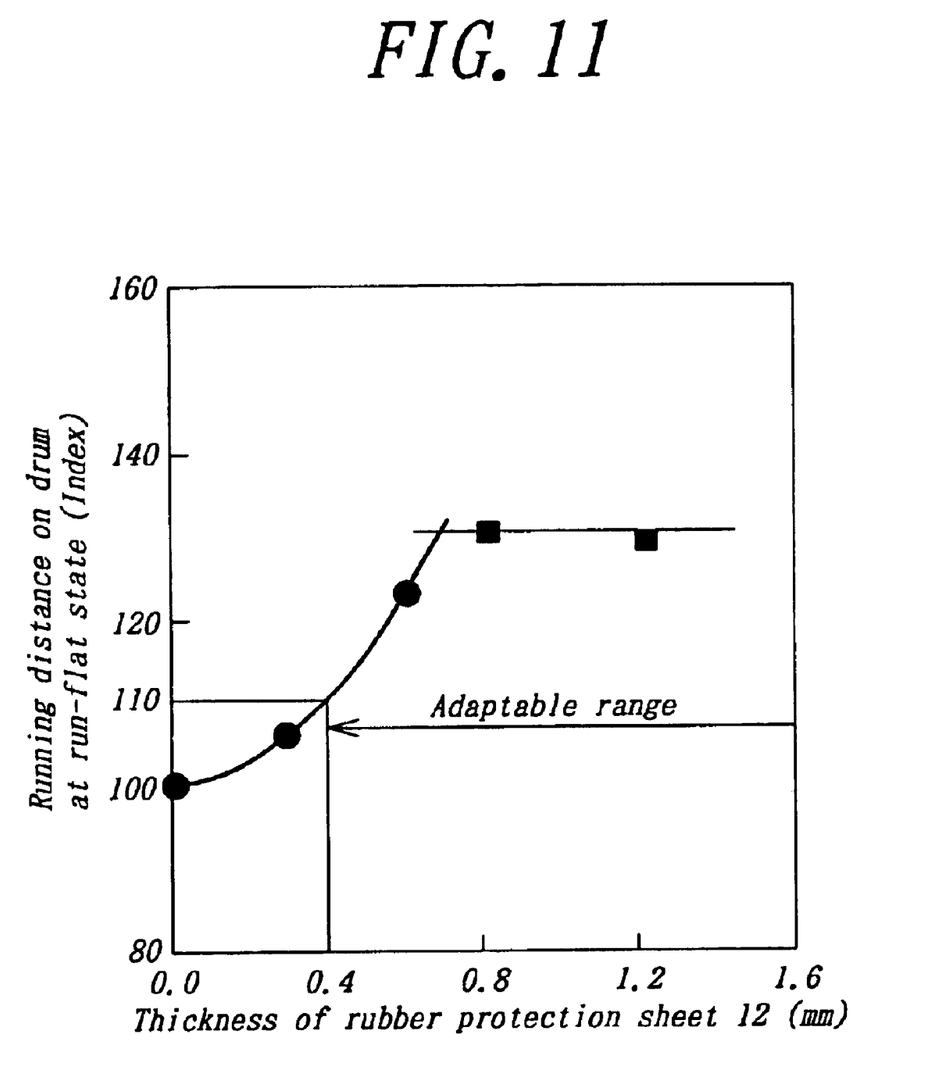
FIG. 11 is a graph showing a relationship between running distance on a drum at a run-flat state and thickness of rubber protection sheet 12.

It is clear from FIG. 10 that the thickness of the rubber protection sheet 11, 13 is preferable to be not less than 0.6 mm and from FIG. 11 that the thickness of the rubber protection sheet 12 is preferable to be not less than 0.4 mm. On the other hand, when the thickness of the rubber protection sheet 11, 12, 13 exceeds 4.0 mm, the thickness becomes too thick and the amount of heat generation in portions provided with the rubber protection sheets 11, 12, 13 becomes excessive to lower the resistance to heat generation and hence the improvement of the run-flat durability can not be attained. Therefore, it is favorable that the thickness of the rubber protection sheet 11, 13 is within a range of 0.6–4.0 mm and the thickness of the rubber protection sheet 12 is within a range of 0.4–4.0 mm.

Moreover, the lower limit in FIGS. 10 and 11 is based on not less than 1.1 times of the control tire 21A.

The following examples are given in illustration of the invention and are not intended as limitations thereof.

There are provided radial tires for passenger car having a tire size of 225/60R16 and a structure as shown in FIGS. 1–3, wherein a carcass 6 is comprised of one turnup ply 6-1 and one down ply 6-2, each of which plies containing rubberized polyester cords of radial arrangement, and a belt 7 comprises two rubberized cross steel cord layers 7-1 and 7-2 and a cap ply 7-3 formed by spirally winding a rubberized nylon-6,6 cord.

In Table 1 are shown tan δ at 25° C. of the rubber protection sheets 11, 12 and 13, ratio ($M_{50}R$) of 50% modulus of the rubber protection sheet 11, 12, 13 to 50% modulus of the rubber reinforcing layer 9 (the same rubber as in the bead filler rubber 8), thickness $d_{11}$ (mm) of the rubber protection sheet 11, thickness $d_{12}$ (mm) of the rubber protection sheet 12, and thickness $d_{13}$ (mm) of the rubber protection sheet 13 of Examples 1–13, respectively. Moreover, the figure number corresponding to the respective example is also shown in Table 1. In order to evaluate the run-flat durability of each example, there are provided the conventional tire 20 having the same structure as in Example 1 except that the rubber protection sheet and cushion rubber are omitted and the comparative tire 21A having the same structure as in Example 1 except that the rubber protection sheet is omitted.

Each of the tires of Examples 1–13, Conventional Example and Comparative Example is mounted onto a recommended rim of 6 1/2JJ and once inflated under a maximum air pressure or a pressure near thereto and then rendered into a run-flat state by releasing the air pressure to zero (an atmospheric pressure). Thereafter, the thus obtained flat tire is pushed onto a drum rotating at a surface speed of 89 km/h under a load of 570 kgf corresponding to about 76% of a maximum load capacity of 750 kgf to measure a running distance until the occurrence of the tire trouble. The measured results are represented by an index on the basis that the comparative tire is 100 as a run-flat durability, wherein the larger the index value, the better the property. These results are also shown in Table 1.

TABLE 1

|  | Number of figure | tan δ (25° C.) | $M_{50}$ R | Thickness of sheet 11 (mm) | Thickness of sheet 12 (mm) | Thickness of sheet 13 (mm) | Index of running distance |
|---|---|---|---|---|---|---|---|
| Conventional Example | FIG. 5 | — | — | — | — | — | 70 |
| Comparative Example | FIG. 6 | — | — | — | — | — | 100 |
| Example 1 | FIG. 3 | 0.10 | 0.75 | 1.3 | 0.7 | 1.3 | 120 |
| Example 2 | FIG. 3 | 0.07 | 0.75 | 1.3 | 0.7 | 1.3 | 130 |
| Example 3 | FIG. 3 | 0.04 | 0.75 | 1.3 | 0.7 | 1.3 | 131 |
| Example 4 | FIG. 3 | 0.07 | 0.95 | 1.3 | 0.7 | 1.3 | 110 |
| Example 5 | FIG. 3 | 0.07 | 0.83 | 1.3 | 0.7 | 1.3 | 110 |
| Example 6 | FIG. 3 | 0.07 | 0.62 | 1.3 | 0.7 | 1.3 | 130 |
| Example 7 | FIG. 3 | 0.07 | 0.75 | 0.4 | 0.7 | 1.3 | 104 |
| Example 8 | FIG. 3 | 0.07 | 0.75 | 0.9 | 0.7 | 0.9 | 125 |
| Example 9 | FIG. 3 | 0.07 | 0.75 | 1.8 | 0.7 | 1.8 | 131 |
| Example 10 | FIG. 3 | 0.07 | 0.75 | 1.3 | 0.3 | 1.3 | 106 |
| Example 11 | FIG. 3 | 0.07 | 0.75 | 1.3 | 0.6 | 1.3 | 123 |
| Example 12 | FIG. 3 | 0.07 | 0.75 | 1.3 | 0.8 | 1.3 | 130 |
| Example 13 | FIG. 3 | 0.07 | 0.75 | 1.3 | 1.2 | 1.3 | 129 |
| Example 14 | FIG. 1 | 0.07 | 0.75 | 1.3 | 0.7 | — | 118 |
| Example 15 | FIG. 2 | 0.07 | 0.75 | — | — | 1.3 | 110 |

As seen from the results of Table 1, in all tires of Examples 1–15 having the rubber protection sheet 11, 12, 13, the run-flat durability is improved as compared with not only the conventional tire but also the comparative tire, and the run-flat durability can largely be improved by properly setting 50% modulus ratio to the rubber reinforcing layer 9 or by properly setting the thickness of the rubber protection sheet.

According to the invention, there can be provided pneumatic tires having particularly an aspect ratio of not less than 60 which maintain cost inclusive of production cost being rich in practice through a simple structure using the conventional thick rubber reinforcing layer together with only a rubber protection sheet, holds the handling easiness for rim assembling operability or the like, and guarantees the safe running of the vehicle such as passenger car or the like even if air is rapidly released due to the puncture or the like, and does not cause fatal trouble even if the high-speed running on the expressway is continued at a limit speed or a speed near thereto for a long time, and can develop a highly excellent run-flat durability.

What is claimed is:

1. A run-flat pneumatic tire comprising;

a radial carcass extending between a pair of bead cores embedded in the respective bead portions to reinforce a pair of sidewall and a tread portion comprised of one or more rubberized cord plies, a belt arranged on an outer peripheral surface of the carcass to reinforce the tread portion, a bead filler taperingly extending from a position just above the bead core toward the end of the tread portion, a rubber reinforcing layer arranged at an inner surface side of an innermost carcass ply from a position near to the bead core in the bead portion near to a position near to the end of the tread portion and having substantially a crescent shape at section thereof, and a rubber protection sheet being softer than the rubber reinforcing layer, an entirety of said rubber protection sheet being disposed between the rubber reinforcing layer and the carcass ply nearest thereto and within a zone extending inward from a position of a line segment in parallel to the rotating axial line of the tire passing through an outer end by the bead filler rubber in the radial direction of the tire, and wherein the rubber protection sheet has tan δ at 25° C. of 0.04–0.11.

2. A run-flat pneumatic tire according to claim 1, wherein at least one ply of the carcass is a turnup ply wound around the bead core from an inside of the tire toward an outside thereof, which consists of a toroidally extending main body and a turnup portion.

3. A run-flat pneumatic tire according to claim 1, wherein in a radial section of a tire-rim assembly when the tire is mounted onto a recommended rim and inflated under a pressure corresponding to 15% of a maximum air pressure, the rubber protection sheet is existent over both sides of a straight line drawn from a curvature center of a flange of the recommended rim at an inclination angle 60° outwardly in a radial direction of the tire with respect to a line segment drawn from the curvature center in parallel to a rotating axial line of the tire toward the inside of the tire.

4. A run-flat pneumatic tire according to claim 1, wherein the rubber protection sheet is existent between line segments in parallel to the rotating axial line of the tire respectively passing through an outer end of the bead filler rubber in the radial direction of the tire and an inner end of the rubber reinforcing layer in the radial direction of the tire.

5. A run-flat pneumatic tire according to claim 1, wherein the at least one rubber protection sheet has 50% modulus of 0.30–0.84 times that of the rubber reinforcing rubber.

6. A run-flat pneumatic tire according to claim 1, wherein the at least one rubber protection sheet has a thickness of 0.4–4.0 mm.

7. A run-flat pneumatic tire comprising:

a radial carcass extending between a pair of bead cores embedded in the respective bead portions to reinforce a pair of sidewall portions and a tread portion comprised of one or more rubberized cord plies, a belt arranged on an outer peripheral surface of the carcass to reinforce the tread portion, a bead filler rubber taperingly extending from a position just above the bead core toward an end of the tread portion, a rubber reinforcing layer arranged at an inner surface side of an innermost carcass ply from a position near to the bead core in the bead portion to a position near to the end of the tread portion and having substantially a crescent shape at section thereof, a rubber protection sheet being softer than the rubber reinforcing layer, an entirety of said rubber protection sheet being disposed between the rubber reinforcing layer and the carcass ply nearest thereto and within a zone extending inward from a position of a line segment in parallel to the rotating axial line of the tire passing through an outer end by the bead filler rubber in the radial direction of the tire, and a second rubber protection sheet being softer than the bead filler rubber and disposed between the bead filler rubber and the carcass ply surrounding it.

8. A run-flat pneumatic tire according to claim 7, wherein when the second rubber protection sheet is disposed along the turnup portion of the carcass ply between the turnup portion and the bead filler rubber, a height of an outer end of the second rubber protection sheet in the radial direction of the tire as measured from an outermost end of the bead core in the radial direction of the tire is not more than two times a height of an intersecting point between the straight line drawn from a curvature center of a flange of the recommended rim at an inclination angle of 60° outwardly in a radial direction of the tire with respect to a line segment drawn from a curvature center in parallel to a rotating axial line of the tire toward the inside of the tire and an outer surface of an outermost carcass ply as measured by the above same method.

9. A run-flat pneumatic tire comprising:

a radial carcass extending between a pair of bead cores embedded in the respective bead portions to reinforce a pair of sidewall portions and a tread portion comprised of one or more rubberized cord plies, a belt arranged on an outer peripheral surface of the carcass to reinforce the tread portion, a bead filler rubber taperingly extending from a position just above the bead core toward an end of the tread portion, a rubber reinforcing layer arranged at an inner surface side of an innermost carcass ply from a position near to the bead core in the bead portion to a position near to the end of the tread portion and having substantially a crescent shape at section thereof, and at least one rubber protection sheet being softer than the bead filler rubber, and disposed between the bead filler rubber and the carcass ply surrounding it, within a zone extending inward from a position of a line segment in parallel to the rotating axial line of the tire passing through an outer end by the bead filler rubber in the radial direction of the tire, wherein the at least one rubber protection sheet has tan δ at 25° C. of 0.04–0.11.

10. A run-flat pneumatic-tire according to claim 9, wherein at least one ply of the carcass is a turnup ply wound around the bead core from an inside of the tire toward an outside thereof, which consists of a toroidally extending main body and a turnup portion.

11. A run-flat pneumatic tire according to claim 9, wherein in a radial section of a tire-rim assembly when the tire is mounted onto a recommended rim and inflated under a pressure corresponding to 15% of a maximum air pressure, the at least one rubber protection sheet is existent over both sides of a straight line drawn from a curvature center of a flange of the recommended rim at an inclination angle 60° outwardly in a radial direction of the tire with respect to a line segment drawn from the curvature center in parallel to a rotating axial line of the tire toward the inside of the tire.

12. A run-flat pneumatic tire according to claim 9, wherein the at least one rubber protection sheet is existent between line segments in parallel to the rotating axial line of the tire respectively passing through an outer end of the bead filler rubber in the radial direction of the tire and an inner end of the rubber reinforcing layer in the radial direction of the tire.

13. A run-flat pneumatic tire according to claim 9, wherein the at least one rubber protection sheet has a thickness of 0.4–4.0 mm.

14. A run-flat pneumatic tire according to claim 9, further comprising a second rubber protection sheet being softer than the rubber reinforcing layer and disposed between the rubber reinforcing layer and the carcass ply nearest thereto.

15. A run-flat pneumatic tire comprising:
- a radial carcass extending between a pair of bead cores embedded in the respective bead portions to reinforce a pair of sidewall and a tread portion comprised of one or more rubberized cord plies,
- a belt arranged on an outer peripheral surface of the carcass to reinforce the tread portion,
- a bead filler rubber taperingly extending from a position just above the bead core toward an end of the tread portion,
- a rubber reinforcing layer arranged at an inner surface side of an innermost carcass ply from a position near to the bead core in the bead portion to a position near to the end of the tread portion and having substantially a crescent shape at section thereof, and
- a rubber protection sheet being softer than the rubber reinforcing layer and being disposed between the rubber reinforcing layer and the carcass ply nearest thereto and within a zone extending inward from a position of a line segment in parallel to the rotating axial line of the tire passing through an outer end by the bead filler rubber in the radial direction of the tire,
- wherein the rubber protection sheet has a thickness of 0.4–4.0 mm
- wherein the rubber protection sheet has tan δ at 25° C. of 0.04–0.11.

16. A run-flat pneumatic tire according to claim 15, wherein at least one ply of the carcass is a turnup ply wound around the bead core from an inside of the tire toward an outside thereof, which consists of a toroidally extending main body and a turnup portion.

17. A run-flat pneumatic tire according to claim 15, wherein in a radial section of a tire-rim assembly when the tire is mounted onto a recommended rim and inflated under a pressure corresponding to 15% of a maximum air pressure, the rubber protection sheet is existent over both sides of a straight line drawn from a curvature center of a flange of the recommended rim at an inclination angle 60° outwardly in a radial direction of the tire with respect to a line segment drawn from the curvature center in parallel to a rotating axial line of the tire toward the inside of the tire.

18. A run-flat pneumatic tire according to claim 15, wherein the rubber protection sheet is existent between line segments in parallel to the rotating axial line of the tire respectively passing through an outer end of the bead filler rubber in the radial direction of the tire and an inner end of the rubber reinforcing layer in the radial direction of the tire.

19. A fun-flat pneumatic tire according to claim 15, wherein the rubber protection sheet has 50% modulus of 0.30–0.84 times that of the rubber reinforcing rubber.

20. A run-flat pneumatic tire according to claim 15, further comprising a second rubber protection sheet being softer than the bead filler rubber and disposed between the bead filler rubber and the carcass ply surrounding it.

21. A run-flat pneumatic tire according to claim 20, wherein when the second rubber protection sheet is disposed along the turnup portion of the carcass ply between the turnup portion and the bead filler rubber, a height of an outer end of the second rubber protection sheet in the radial direction of the tire as measured from an outermost end of the bead core in the radial direction of the tire is not more than two times a height of an intersecting point between the straight line drawn from a curvature center of a flange of the recommended rim at an inclination angle of 60° outwardly in a radial direction of the tire with respect to a line segment drawn from a curvature center in parallel to a rotating axial line of the tire toward the inside of the tire and an outer surface of an outermost carcass ply as measured by the above same method.

* * * * *